(No Model.)
D. D. FUNK & J. P. WHITE.
HORSE HAY RAKE.
No. 448,332. Patented Mar. 17, 1891.
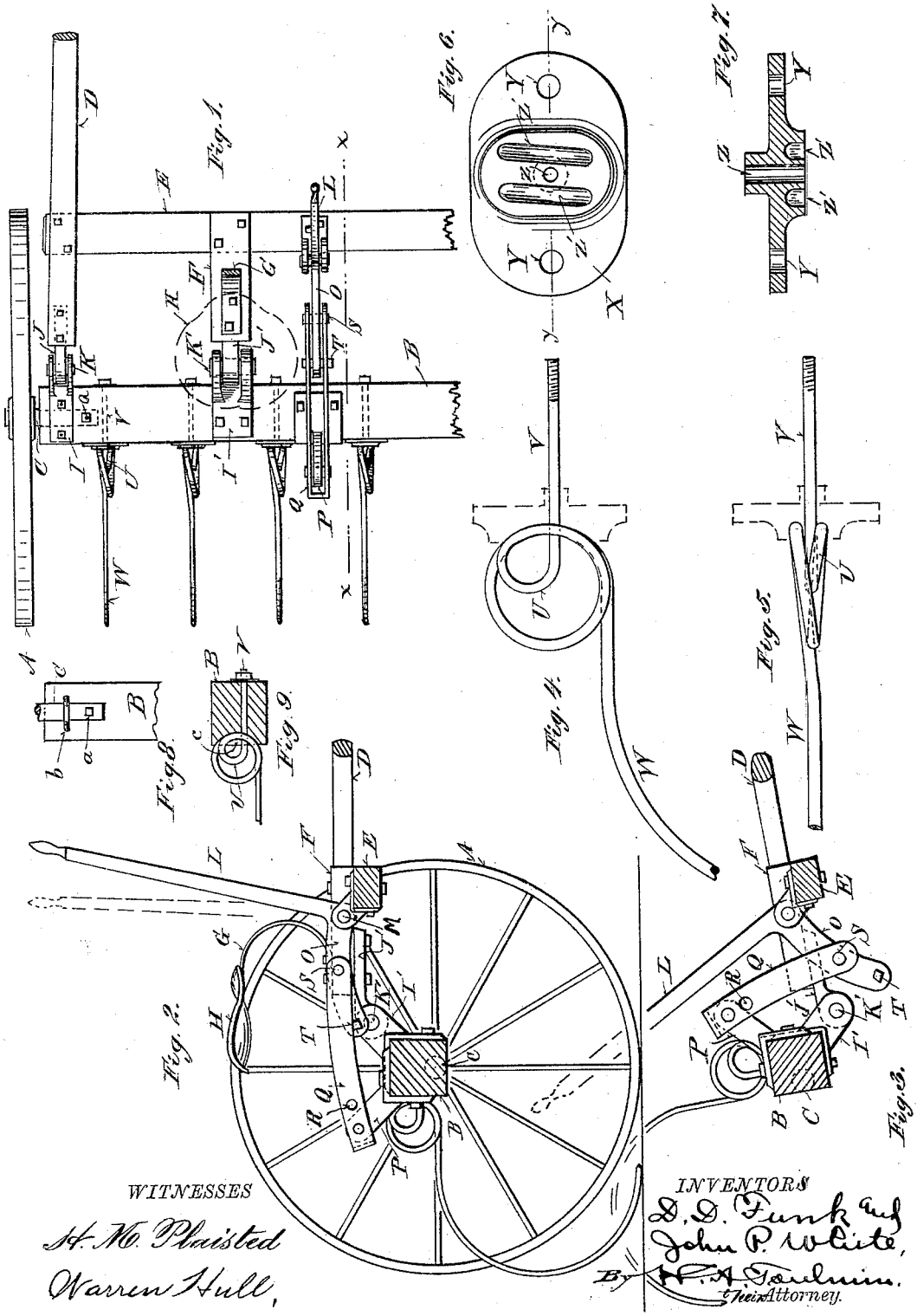
WITNESSES
H. M. Plaisted
Warren Hull
INVENTORS
D. D. Funk and
John P. White,
By H. A. Toulmin.
Their Attorney.

UNITED STATES PATENT OFFICE.

DANIEL D. FUNK AND JOHN P. WHITE, OF SPRINGFIELD, OHIO.

HORSE HAY-RAKE.

SPECIFICATION forming part of Letters Patent No. 448,332, dated March 17, 1891.

Application filed April 26, 1890. Serial No. 349,582. (No model.)

*To all whom it may concern:*

Be it known that I, DANIEL D. FUNK and JOHN P. WHITE, citizens of the United States, residing at Springfield, in the county of Clark and State of Ohio, have invented certain new and useful Improvements in Horse Hay-Rakes, of which the following is a specification, reference being had therein to the accompanying drawings.

This invention relates to certain new and useful improvements in horse hay-rakes, and has reference to an arrangement of the coils of the tines, whereby the shank portion which connects with the rake-head occupies a central position between the coils, so that the tine will not be deflected to either side when drawn up tight against its seat, has reference to a peculiar construction of the casting which forms the seat for the tines, and has reference to certain details hereinafter described, and more fully pointed out in the claims.

In the accompanying drawings, forming a part of this specification, and on which like reference-letters indicate corresponding parts, Figure 1 represents a plan view of a part of a hay-rake embodying our improvements; Fig. 2, a sectional view thereof on the line $x\,x$ of Fig. 1; Fig. 3, a detail sectional view of the rake-head and thill-frame and a side elevation of the several parts shown in a "dump" position; Fig. 4, a detail side view of one of the tines with the seat in dotted lines; Fig. 5, a detail plan view of one of the tines, also showing the seat in dotted lines; Fig. 6 a detail view of one of the tine-seats; Fig. 7, a sectional view on the line $y\,y$ of Fig. 6; Fig. 8, a bottom view of one end of the rake-head, and Fig. 9 a section next to one tine-shank.

In the wheels A, of any approved type, is mounted the rake-head B, which also constitutes the axle. Metallic spindles C are secured to the head in any convenient manner. The thill-frame consists of shafts D and a cross-bar E, to which latter is bolted or otherwise fastened a seat-beam F, extending toward the rake-head. Upon this beam is fastened the spring-seat G, carrying a seat H.

The connection between the thill-frame and the rake-head is pivotal; and it consists of brackets I, secured one near each end of the rake-head, and of a stout plate J, secured to each shaft. A bolt or pin K pivotally connects these brackets or plates. Thus the thills are pivotally connected with the rake-head. It will be noticed from Fig. 2 that the brackets extend upward and forward. This is preferred, as it brings the pivotal point at a desirable position to effect the dumping operation, as will hereinafter appear. A further pivotal connection between the thill-frame and the rake-head consists of a similar bracket I' and a similar plate J', the latter secured to the under side of the seat-beam F, which is fastened to the single cross-bar E. A bolt or pin K' forms the pivot between these two parts, and the seat is preferably supported by the spring or otherwise, so that the line of gravitation passes through said pivot, thereby taking the entire weight of the driver from the thills and horse's back and causing it to act on the rake-head only to assist the dump. These three pivots are in line, and the weight of the thills and of the driver is upon them with a constant tendency to press down upon the pivots and rotate the rake-head in a direction to raise the tines from the ground, the brackets I and I' acting as levers upon the rake-head. To prevent this normal tendency of the weight from effecting the dumping operation, locking instrumentalities are employed. The preferred type of these instrumentalities is illustrated in the accompanying drawings, and consists of a hand-lever L, pivoted in a casting M, secured to the thill-beam E, and having a curved rearward extension O. The lever and its extension are preferebly formed in one piece. An arm P is connected to the rake-head and extends rearwardly and upwardly. A link or strap Q is preferably connected to this arm by a pin passing through one or the other of the several holes R, according to the desired adjustment. The forward end of the link pivotally connects with the extension O of the lever, as seen at S. The connection with the extension is above a line drawn from the lever-pivot to the stop on the extension. The link is double, or two-part, as seen in Fig. 1, and the lug or projection T on the extension O fits against the lower edge of the link and acts as a stop or lock. It will be observed that the pivotal point S in Fig. 2 is above the pivotal point of the lever and the pivotal connection between the link Q and the arm P. The result of this is that the tendency of the link to move forward is to throw the lever forward; but the lug T prevents the upward movement of the rear end of the extension, and thus the parts are locked and the rake-head held in operative position, so as to keep the tines to the ground. The mere act of throwing the lever forward brings these parts into a locked position, and the mere act of drawing the lever backward, as suggested by the dotted lines in Fig. 2, so changes the relative position of the three said pivotal points that the pressure of the link acts beneath the pivotal point of the lever. As soon as the lever is moved back far enough to effect this position of the said pivotal points, then the weight of the thill-frame and the driver, suppplemented by the lifting tendency of the tines, quickly rotates the head and effects the dump, the parts assuming the extreme position shown in Fig. 3. The driver may, if he pleases, press down upon the link and extension O at or near the pivotal connection, instead of taking hold of the lever L, or he may both press down and draw the lever rearward at the same time. When the lever is thrown back to the position of the parts when in a dumping relation, the driver can conveniently take hold of it, and with the excessive leverage the organization affords raise the thill-frame and throw the parts up in a normal or operative position, which position is reached when the stop T strikes the link Q. The parts are then locked and the tines ready to gather the hay.

Referring now to the arrangement of the coils of the tines, it will be seen that the peculiarity consists in giving one of the coils a shorter bend than the others, as seen at U, and in projecting the shank between the coils in line with the body W of the tine, as seen in Fig. 5. Whether there be one or more than one coil at either side of the shank V is not material, so long as the shank occupies a central position with respect to the coils and a position practically in line with the body of the tine. By this organization there is no tendency to throw the tine to one side when the shank is drawn upon and the coils brought firmly into their seat.

We prefer to use a metallic seat for the tines, such seat to be fitted against and secured to the rake-head; but our improved tine may be used without any seat by drawing the coils firmly against the head itself. The seat consists of a casting X, having openings Y to receive the fastenings for securing it to the head, and also having a central hole Z for the shank V. At either side of this hole is formed as many grooves Z′ as there are coils at either side of the shank. These grooves are curved to fit the contour of the coils, which seat themselves in the grooves, while the shank passes between the coils and between the grooves into the central opening.

We have stated that the spindles may be attached to the rake-head in any desired manner. We show the preferred manner, the same consisting in passing the bolt $a$ through the spindle and the head and securing the bolt by a nut, and also consisting of a U-shaped bolt $b$, placed nearer to the end of the head, embracing the spindle, and passing through the head. If desired this U-shaped bolt may also be used to form the means of fastening the bracket I to the head. The bolt $a$ prevents the longitudinal displacement of the spindle, and the U-shaped bolt $b$ binds the spindle securely to the head and avoids the further drilling of the spindle. We have also stated that the tines may be used without the metallic seats. When this is done, it is preferred to recess the head, as shown at $c$, the recess being adapted to receive the coils of the tine. This is a more economical construction and is very effective, especially when the head is made of hard wood.

Having thus fully described our invention, what we claim as new, and desire to secure by Letters Patent, is—

1. In a hay-rake, a tine having coils and a shank, the latter located between the coils and substantially in line with the body.

2. In a hay-rake, a tine having coils, a portion of one of which is bent in a shorter radius than the others, and a shank projecting from said coil and located between the coils and substantially in line with the body of the tine.

3. In a hay-rake, a tine having coils and a shank passing between two of the coils.

4. In a hay-rake, the combination, with a tine having coils and a shank located between two of the coils, of a metallic seat having grooves to receive the coils and a central opening to receive the shank.

In testimony whereof we affix our signatures in presence of witnesses.

DANIEL D. FUNK.
JOHN P. WHITE.

Witnesses:
  ED. E. CALLOW,
  VICTOR Y. SMITH.